US006457435B1

(12) United States Patent
Bridges

(10) Patent No.: US 6,457,435 B1
(45) Date of Patent: Oct. 1, 2002

(54) PET TOILET

(76) Inventor: Anthony Bridges, 2650 Treehouse La., Lawrenceville, GA (US) 30044

( * ) Notice: Subject to any disclaimer, the term of this patent is extended or adjusted under 35 U.S.C. 154(b) by 0 days.

(21) Appl. No.: 09/911,302

(22) Filed: Jul. 23, 2001

(51) Int. Cl.[7] .............................................. A01K 29/00
(52) U.S. Cl. ...................................................... 119/163
(58) Field of Search ................................ 119/163, 479, 119/527

(56) References Cited

U.S. PATENT DOCUMENTS

| | | | | |
|---|---|---|---|---|
| 1,813,329 A | * | 7/1931 | Supplee | 119/527 |
| 3,734,057 A | * | 5/1973 | Lee et al. | 119/163 |
| 3,842,803 A | * | 10/1974 | Temel | 119/163 |
| 5,148,771 A | * | 9/1992 | Schuett et al. | 119/479 |
| 5,755,181 A | * | 5/1998 | Petkovski | 119/163 |

* cited by examiner

Primary Examiner—Charles T. Jordan
Assistant Examiner—Elizabeth Shaw
(74) Attorney, Agent, or Firm—Joseph G. Mitchell, Patent Attorney

(57) ABSTRACT

A pet toilet for use indoors. The pet toilet has electronic sensing detection devices built within its parallel walls of a housing. Such electronic sensing detection devices determine the pet's entrance and leaving. Once the pet leaves the housing, the system flushes. The pet toilet is attached to conventional household drains. The water is supplied by a water supply line and feeds such water through water distribution lines which are embedded in the parallel walls of the housing. The invention also encompasses a manual flush button in case the pet owner wishes to flush the system manually, and also the housing comprises a water spray assembly to effectively clean the housing with a hand-held spray device.

3 Claims, 1 Drawing Sheet

PET TOILET

BACKGROUND OF THE INVENTION

1. Field of the Invention

The field of invention relates to a pet toilet. More particularly, the invention provides a cleaner and healthier method for a pet, particularly a dog or cat, to do such pet's business. The invention provides a toilet whereby a household pet can use it, and such toilet activates itself for flushing after use by actions of the pet leaving the toilet.

2. Description of Prior Art

With the enactment of laws in many locations requiring owners to remove from the streets and sidewalks solid wastes left by pets, the amount of distasteful work involved in keeping pets has increased. Thus, there is a well recognized need for accommodating pets, especially dogs, to defecate. This is true not only in large cities but also in smaller ones as well. Therefore, a need exists for a convenient, effective and easy to use toilet for pets which can be located within one's home and which can automatically clean itself.

In the prior art, there have been several attempts to develop a device suitable for use as a pet toilet.

For example, U.S. Pat. No. 2,204,416, invented by Kramer, depicts an animal toilet that flushes when the animal moves to a different chamber within the toilet structure. The animal toilet flushes via a tilter board.

U.S. Pat. No. 3,747,563, invented by Brockhouse, discloses a toilet in which entry of the pet onto an upwardly biased treadle forces the treadle to a level position which, in turn, conditions a valve actuation arrangement for opening a control valve when the pet leaves. When the pet steps off the toilet, the treadle returns to its upwardly inclined position whereby control of the valve is opened and a large volume of water flushes down the treadle.

U.S. Pat. No. 3,771,491, invented by Hunter, discloses a pet toilet that activates or flushes upon an animal leaving the toilet's door. When the animal leaves such toilet, via the door, cables and pulleys cause the toilet to flush.

Many of the pet toilets, in the prior art, have flush tanks and activate through mechanical means. An example of this is contained in U.S. Pat. No. 3,318,285 invented by Betham.

A few other pet toilets contain a urinating post. An example for this is contained in U.S. Pat. No. 3,964,437 to Brown.

There are some pet toilets that activate via an electronic sensing means. In U.S. Pat. No. 3,811,410, to Roberts, a sensing means detects the animal's entrance to the toilet and then, flushes after a pre-determined time via a timing device. In U.S. Pat. No. 4,660,506, to Nalven, the animal stands or sits on a flexible platform, thereby deflecting it, and relieves itself. After the animal leaves, a sensor detects that the flexible platform has returned to its normal level and water is automatically introduced to a level of the platform. An ultrasonic transducer emits ultrasonic waves which clear the platform and other areas of the pet toilet.

The prior art has several limitations. In some cases, the prior art is not connected to the home's conventional plumbing system and this can cause the need for human intervention in order to properly clean the device. In other cases, the device's structure is such that it limits the size of the pet, so that only smaller animals can use the device. In still other prior art toilets, a timing device could cause the toilet to flush while in use or a malfunction of moveable flooring, upon flushing, could injure the pet.

The present invention is a new improved pet toilet which overcomes these disadvantages. The present invention is very convenient for use in the home, and the flushing and cleaning are carried out automatically.

SUMMARY OF THE INVENTION

In view of the foregoing disadvantages inherent in the known prior art, the present invention provides a pet toilet which could be utilized indoors much like a cat litter box. However, unlike a cat litter box, this particular pet toilet is self-cleaning and is automatic in operation.

The invention comprises a housing which is large enough to accept many variations in the size of pets, especially dogs. Typically, the housing would be approximately 6' in length, 3' in width and approximately 3' in height. It would preferably be made of molded fiberglass for strength and sanitation. The housing has a removable floor. The removable floor has a series of drain holes within said removable floor. The drain holes are configured with said removable floor to drain to the center of the housing's bottom. Within said bottom of the housing is a drain hole that is connected to the household's sewage system. It is anticipated that the housing would be attached to the conventional household plumbing system so that the housing can operate in place and be cleaned without moving the housing to a sewage discharge area.

The housing additionally consists of parallel walls. The preferred method is that, at each end of said parallel walls, there are embedded therein electronic sensing detection devices. However, electronic sensing detection devices can be placed at different places within the housing or said parallel walls. Embedded at the upper rim of the parallel walls are water distribution lines which feed into a plurality of openings to distribute water down the inside of said parallel walls.

In operation, a pet, typically a dog, would walk into either end of the openings in the housing. Upon entering the housing, the electronic sensing detection devices sense the pet's entrance. The pet would then do its business. The pet would then exit the housing. Upon exiting either opening, the electronic sensing detection devices would sense the pet's exit and cause water, which is supplied through the water supply line, to be distributed throughout the upper rim of the parallel walls by the embedded water distribution lines. In the upper rim of the parallel walls there is distributed water that flows out of the plurality of openings to distribute water down the inside of the parallel walls so as to flow down to the removable floor and to effect removal of the pet's waste. The drain holes in the removable floor are satisfactory to accept the waste and transport it to the household sewage system.

The housing also encompasses a manual push flush button in case the pet owner wishes to flush the system manually, and the housing also encompasses a water spray assembly whereby the pet owner can effectively clean the housing with a hand-held spray device.

The invention resides not in any one of these features per se, but rather in the particular combination of all of them herein disclosed and claimed, and it is distinguished from the prior art in this particular combination of all its structures for the functions specified.

There has thus been outlined, rather broadly, the important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved pet toilet which has all of the advantages of the prior art and none of the disadvantages.

It is another object of the present invention to provide a new and improved pet toilet which may be easy to install and easy for the pet to use.

It is a further object of the present invention to promote a new and improved pet toilet which can accommodate many variations in the size of the pets that can use the device.

It is a further object of the present invention to promote a new and improved pet toilet which provides the ability of the pet to use it without discomfort.

It is a further object of the present invention to promote a new and improved pet toilet which avoids injuries of the pet.

It is a further object of the present invention to promote a new and improved pet toilet that is animal controlled and requires minimal pet training.

It is a further object of the present invention to promote a new and improved pet toilet which provides a means for the pet to avoid befouling the public or private environment.

An even further object of the present invention is to provide a new and improved pet toilet which is susceptible of a low cost of manufacture with regard to both materials and labor, and which accordingly is then susceptible of low prices of sale to the consuming public, thereby making such device economically available to the buying public.

Still yet another object of the present invention is to provide a new and improved pet toilet which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its use, reference should be had to accompanying drawings and descriptive matter which there is illustrated preferred embodiments of the invention.

BRIEF DESCRIPTION OF THE DRAWINGS

The invention will be better understood based on the following detailed description. Such description makes reference to the annexed drawings wherein.

DESCRIPTION OF THE PREFERRED EMBODIMENT

Figure 1:
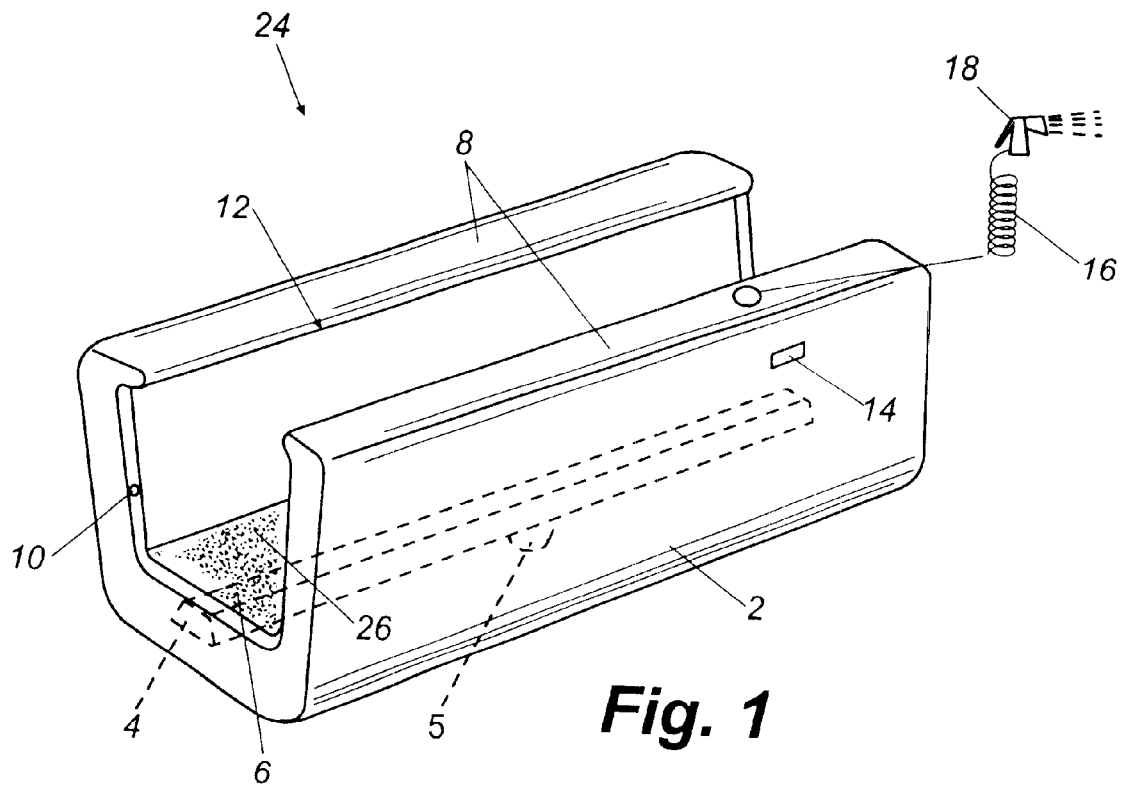
FIG. 1 shows a perspective view of the invention.
Figure 2:
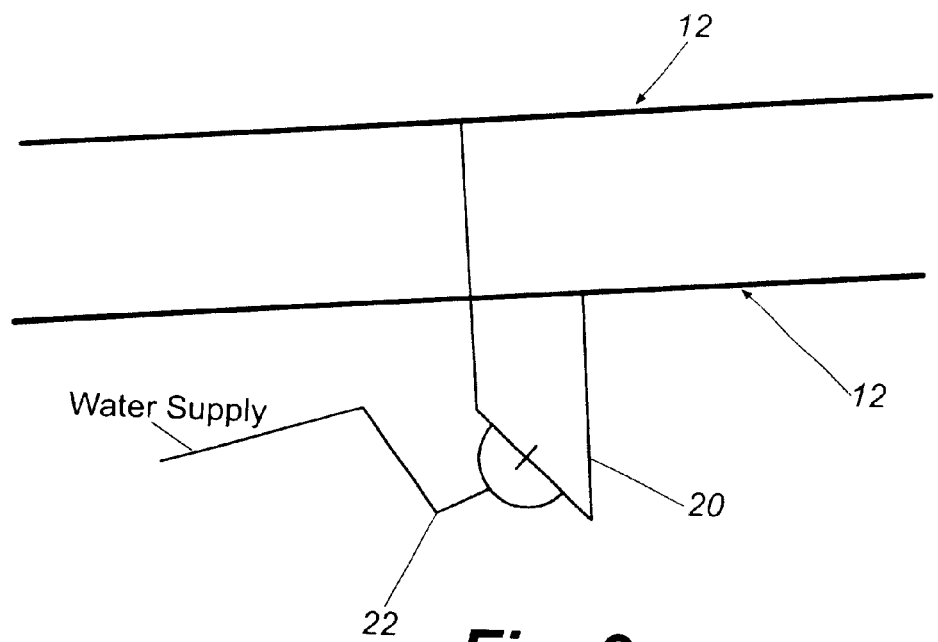
FIG. 2 shows a view of the piping for the water distribution lines for the parallel walls of the invention.

With reference now to the drawings, and in particular FIGS. 1 and 2, the pet toilet which embodies the principles and concepts of the present invention.

With reference to FIG. 1, FIG. 1 depicts a perspective view of the invention. The invention 24 comprises a housing 2. The housing 2 is made to accept many variations in the size of pets, especially dogs. Typically, the housing 2 would be approximately 6' in length, 3' in width and approximately 3' in height. It would preferably be made of molded fiberglass for strength and sanitation. The housing 2 has a bottom (which is not shown) and parallel walls 8. Embedded at the upper rim of the parallel walls 8 are water distribution lines 12. The water distribution lines 12 feed into openings in the parallel walls 8. The preferred method is to, at each end of said parallel walls 8, embed therein electronic sensing detection devices 10. However, the electronic sensing detection devices 10 can also be placed within the housing 2 or at other places within the parallel walls 8.

The housing 2 has a removable floor 6. The removable floor 6 has a series of drain holes 26 within said removable floor 6. The drain holes 26 are configured with said removable floor 6 to drain to the center 4 of the housing's bottom. Within said bottom of the housing 2 is a drain hole (not shown) that is connected to the household's sewage system. It is anticipated that the housing 2 would be attached to the conventional household plumbing system so that the housing 2 can operate in place and be cleaned without moving the housing 2 to a sewage discharge area.

The housing 2 also encompasses a manual push flush button 14 in case the pet owner wishes to flush the system manually, and the housing 2 also encompasses a water spray assembly whereby the pet owner can effectively clean the housing with a hand-held spray device. The water spray assembly comprises a hose 16 and a sprayer 18.

With reference to FIG. 2, FIG. 2 depicts the water distribution lines 12 which are embedded within the parallel walls. Pipes 20 feed the water distribution lines 12 from the water supply line 22.

In operation, an infrared light beam is emitted from the electronic sensing detection devices 10. A pet, typically a dog, walks into either end of the openings in the housing 2. Upon entering the housing 2, a light beam is reflected back into the electronic sensing detection devices 10 and such light beam is transformed into a low voltage electrical signal. Once the electronic sensing detection devices 10 activate, the circuit of such electronic sensing detection devices 10 are in a hold position for as long as the pet remains in the housing 2. The pet would then do its business. The pet would then exit the housing 2. Upon the pet exiting either opening of the housing 2, the electronic sensing detection devices 10 sense such pet's exit and cause an electronic signal to be initiated to energize the flushing of the water, which is supplied through the water supply line 22, to be distributed throughout the upper rim of the parallel walls 8 by the embedded water distribution lines 12. In the upper rim of the parallel walls 8 there is distributed water that flows out of the plurality of openings to distribute water down the inside of the parallel walls 8 so as to flow down to the removable floor 6 and to effect removal of the pet's waste. The drain holes 26 in the removable floor 6 are satisfactory to accept the waste and transport it to the household sewage system. The circuit of the electronic detection devices 10 is then automatically reset for the next use.

The electronic detection devices 10 do not operate on a timing system, but, rather, on a detection system. This is important because different type pets do their business at different intervals of time. In this way, the invention can be used by a number of different type animals without the system flushing while the pet is using it. In this way, injuries to the pet are avoided and the invention's use is increased. A source of the electronic detection devices 10 is the Sloan Valve Company in Franklin Park, Ill.

With respect to the above description then, it is to be realized that the optimum dimensional relationships for the invention to include variations in size, materials, shape, form, function and manner of operation, assembly and use, are deemed readily apparent and obvious to one skilled in the art, and all equivalent relationships to those skilled in the art, and all equivalent relationships to those illustrated in the drawings and described in the specification are intended to be encompassed by the present invention.

Thus, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A pet toilet, comprising:
   a housing, being approximately six feet in length and approximately three feet wide, having parallel walls and a hole in the bottom, said hole in the bottom of said housing is connected to conventional plumbing;
   said parallel walls, being approximately three feet high, having openings in substantially the upper portion of said parallel walls;
   water distribution lines being embedded within said parallel walls, said water distribution lines have openings therein for the introduction of water into said housing;
   a removable floor being provided within said housing and having drain holes in said removable floor, wherein said drain holes within said removable floor are configured to drain to the center of the hole in the bottom of said housing;
   electronic sensing detection devices that sense a pet's entry and exit into said housing and activate the flushing of water to said water distribution lines upon the pet's exit of said housing;
   a manual push flush button attached to said housing; and
   a water spray assembly wherein said water spray assembly comprises a hose and a sprayer.

2. A pet toilet, comprising:
   a housing having parallel walls and a hole in the bottom;
   said parallel walls having openings in substantially the upper portion of said parallel walls;
   water distribution lines being embedded within said parallel walls;
   a removable floor being provided within said housing and having drain holes in said removable floor;
   a manual push flush button attached to said housing;
   a water spray assembly wherein said water spray assembly comprises a hose and a sprayer; and
   a sensor means provided within said parallel walls to detect the entering and exiting of a pet within said housing and activate the flushing of water through said water distribution lines.

3. A pet toilet, comprising:
   a housing, being approximately six feet in length and approximately three feet wide, having parallel walls and a hole in the bottom, said hole in the bottom of said housing is connected to conventional plumbing;
   said parallel walls, being approximately three feet high, having openings in substantially the upper portion of said parallel walls;
   water distribution lines being embedded within said parallel walls, said water distribution lines have openings therein for the introduction of water into said housing;
   a removable floor being provided within said housing and having drain holes in said removable floor;
   a manual push flush button attached to said housing;
   a water spray assembly wherein said water spray assembly comprises a hose and a sprayer; and
   electronic sensing detection devices that sense a pet's entry and exit into said housing and activate the flushing of water to said water distribution lines upon the pet's exit of said housing.

* * * * *